United States Patent
Yang et al.

(10) Patent No.: US 11,361,534 B2
(45) Date of Patent: Jun. 14, 2022

(54) METHOD FOR GLASS DETECTION IN REAL SCENES

(71) Applicant: DALIAN UNIVERSITY OF TECHNOLOGY, Liaoning (CN)

(72) Inventors: Xin Yang, Liaoning (CN); Xiaopeng Wei, Liaoning (CN); Qiang Zhang, Liaoning (CN); Haiyang Mei, Liaoning (CN); Yuanyuan Liu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 12 days.

(21) Appl. No.: 17/257,704

(22) PCT Filed: Mar. 13, 2020

(86) PCT No.: PCT/CN2020/089943
§ 371 (c)(1),
(2) Date: Jan. 4, 2021

(87) PCT Pub. No.: WO2021/169049
PCT Pub. Date: Sep. 2, 2021

(65) Prior Publication Data
US 2022/0148292 A1    May 12, 2022

(30) Foreign Application Priority Data
Feb. 24, 2020    (CN) .................... 20 2010 112 303.8

(51) Int. Cl.
*G06V 10/44*    (2022.01)
*G06V 10/70*    (2022.01)
(Continued)

(52) U.S. Cl.
CPC .......... *G06V 10/7747* (2022.01); *G06V 10/44* (2022.01); *G06V 10/768* (2022.01);
(Continued)

(58) Field of Classification Search
None
See application file for complete search history.

(56) References Cited

U.S. PATENT DOCUMENTS

| | | | |
|---|---|---|---|
| 8,345,921 B1* | 1/2013 | Frame | G06V 10/768 382/105 |
| 2017/0030716 A1* | 2/2017 | Ali | G06V 40/10 |

(Continued)

FOREIGN PATENT DOCUMENTS

| | | |
|---|---|---|
| CN | 108898078 A | 11/2018 |
| CN | 110210485 A | 9/2019 |
| CN | 110335299 A | 10/2019 |

OTHER PUBLICATIONS

Nian Liu et al., "DHSNet: Deep Hierarchical Saliency Network for Salient Object Detection", 2016 IEEE Conference on Computer Vision and Pattern Recognition, Dec. 12, 2016, pp. 678-686, ISSN:1063-6919.

*Primary Examiner* — Soo Shin
(74) *Attorney, Agent, or Firm* — Muncy, Geissler, Olds & Lowe, P.C.

(57) ABSTRACT

The invention discloses a method for glass detection in a real scene, which belongs to the field of object detection. The present invention designs a combination method based on LCFI blocks to effectively integrate context features of different scales. Finally, multiple LCFI combination blocks are embedded into the glass detection network GDNet to obtain large-scale context features of different levels, thereby realize reliable and accurate glass detection in various scenarios. The glass detection network GDNet in the present invention can effectively predict the true area of glass in different scenes through this method of fusing context features of different scales, successfully detect glass with different sizes, and effectively handle with glass in different scenes. GDNet has strong adaptability to the vari- (Continued)

ous glass area sizes of the images in the glass detection dataset, and has the highest accuracy in the field of the same type of object detection.

3 Claims, 3 Drawing Sheets

(51) Int. Cl.
*G06V 10/77* (2022.01)
*G06V 10/774* (2022.01)
*G06V 10/776* (2022.01)
*G06V 10/80* (2022.01)

(52) U.S. Cl.
CPC ........ *G06V 10/776* (2022.01); *G06V 10/7715* (2022.01); *G06V 10/806* (2022.01)

(56) References Cited

U.S. PATENT DOCUMENTS

| | | |
|---|---|---|
| 2017/0351941 A1 | 12/2017 | Mishra et al. |
| 2018/0025240 A1* | 1/2018 | Klement ................. G06F 3/012 348/47 |
| 2021/0357656 A1* | 11/2021 | Ren ........................ G06V 10/52 |
| 2022/0027661 A1* | 1/2022 | Deng .................... G06V 10/443 |
| 2022/0066207 A1* | 3/2022 | Croxford ................ G06F 3/013 |

* cited by examiner

METHOD FOR GLASS DETECTION IN REAL SCENES

TECHNICAL FIELD

The invention belongs to the object detection field in the computer vision field, and the specific realization result is the detection of glass, and particularly relates to a method for glass detection in real scenes.

BACKGROUND

The object detection task on a two-dimensional image is to determine the size and position of the object in the image according to the detection target defined by the user. Detection methods range from traditional artificially designed features plus shallow classifier frameworks to end-to-end detection frameworks based on deep learning. The methods and types of object detection are progressively improved and perfected with the continuous development of deep learning.

However, there are still many uncertain factors in the object detection process, and when the detected object is glass, because that the glass is a transparent amorphous solid, this kind of object that made of glass will cause a significant impact for the existing vision systems (such as depth prediction and instance segmentation) and will further affect intelligent decision-making in many applications (such as robot navigation and drone tracking). For example, robots/drones may collide with glass walls. Therefore, the vision system which can detect and segment the glass according to the input image has great practical significance and application value.

The existing methods related to glass detection methods mainly include semantic segmentation, salient object detection and reflection removal methods.

(a) Semantic Segmentation

Semantic segmentation aims to segment and parse a given image into different regions that can be associated with the semantic categories of discrete objects. It is usually, based on a Fully Convolutional Network (FCN), uses multi-scale context aggregation or uses more discriminative context features to achieve high segmentation performance. However, when the image contains a large glass, the transparent nature of the glass will cause a great degree of interference in semantic segmentation. Objects behind the glass will be recognized by the system while transparent glass will often be ignored which leads to errors in the system's semantic understanding of the scene.

(b) Salient Object Detection

The salient object detection aims to identify the most salient objects in the image, that is, to find the objects of interest in the image or video, and to detect their position, size and shape at the same time. Many of the latest deep models are dedicated to making full use of the integration of different levels of features to enhance the performance of neural networks, such as gradually integrating local context information to predict fine saliency maps. However, because the shape, size, and position of the glass are not fixed, and under normal circumstances, the content presented in the glass area is a real scene, not just one or more salient objects, which will cause large errors in the detection of glass by this type of method.

(c) Removing Reflection

Reflection is one of the image impairments that often occurs when shooting images through the glass. The existence of reflection can prove the existence of glass in the reverse direction, so we can try to solve this glass detection problem through the single image reflection removal (SIRR) method. However, the existence of reflection does not appear in all areas of the glass, and the degree of reflection is closely related to the light conditions. When there is only a small or very weak reflection in the glass area, the SIRR method still cannot completely solve the glass detection problem.

In addition, because glass detection is a newly raised problem, the existing open source dataset does not have a large-scale dataset specially constructed for glass detection problems; To conduct research on glass detection problems, the present invention constructed the first large-scale Glass Detection Dataset (GDD), and realized glass detection based on context information.

SUMMARY OF THE INVENTION

The purpose of the present invention is to realize a glass detection method through a more efficient context feature integration method for a single image, and it is suitable for glass because of the various shapes and sizes. To achieve the above objective, the present invention first provided a Glass Detection Dataset (GDD) with multiple scenes. Based on this dataset, a glass detection method in a real scene is proposed. By feeding a given single RGB image to generate the final glass detection result.

The technical solution of the present invention is:

A method for glass detection in a real scene, the method includes the following steps:

Step 1 Construct Glass Detection Dataset GDD

Using the latest cameras and smartphones to capture glass images and construct a Glass Detection Dataset GDD; professional annotators mark the pixel-level glass masks. The GDD covers various of daily life scenes (such as bathrooms, offices, streets, or shopping malls) to ensure the diversity of network learning and the applicability of the network. The images are all shot in real scenes, which facilitates the subsequent use of the network in a real environment and has better applicability. The images in the obtained GDD are divided into training set and testing set.

Step 2 Multi-Level Feature Extractor Extracts Features

Input the images in the training set of the GDD dataset constructed in step 1 into the multi-level feature extractor (MFE) to harvest features of different levels. MFE is mainly implemented using traditional feature extraction networks, such as VGG16 and ResNet50 networks with feature extraction capabilities.

Step 3 Constructing a Large-Scale Contextual Feature Integration LCFI Block

The LCFI block is designed to effectively extract contextual information in a large-scale range. It is a basic part of the Glass Detection Network (GDNet). The LCFI block is mainly used for context inference and positioning. The common method of obtaining more context information in traditional methods is to use convolution with a large kernel or dilated convolution. However, a large kernel will result in heavy calculations, and a large dilated rate will result in sparse sampling.

The present invention uses cross convolution to construct an LCFI block: through vertical convolution and horizontal convolution with a dilation rate of r and a kernel size of k, feature extraction in a large-scale range with a small amount of calculation is realized. Since the content in the glass area is usually very complicated, it is necessary to use contextual features with different characteristics to eliminate ambiguity. Therefore, another parallel cross convolution with the reverse order is used, that is, the horizontal convolution with the kernel size k is used first, and then vertical convolution is used to extract complementary large-scale context features for disambiguation.

Step 4 Designing LCFIM Module

One LCFI block can be determined by given kernel size k and dilation rate r, but only using a single LCFI block can only extract context features in a fixed size scale. And if the scale is not enough to cover the entire glass area, incomplete detection will occur. On the other hand, if the extracted feature area is too large for a small glass area, too much noise will be introduced. To solve this problem, the present invention combines n LCFI blocks of different scales to form an LCFIM module, to obtain contextual features from different scales.

Specifically, the feature layer extracted by MFE is fed into n parallel LCFI blocks, and the output of each LCFI block is fused through the attention module. At the same time, an information flow is added between two adjacent LCFI blocks to further explore more contextual features, that is, the output of the current LCFI block is used as the input of the next LCFI block; In this way, the local features from the previous LCFI block and the context features of the current block are fused, and further processed by the current LCFI block, which expands the scale of exploration.

Step 5 Combining to Form a GDNet and Outputting the Detection Results

The multi-level feature extractor MFE in step 2 and the LCFIM module constructed in step 4 are embedded in the glass detection network GDNet to obtain large-scale context features of different levels. The glass detection network GDNet includes multi-level feature extraction MFE, LCFIM module, and the subsequent deconvolution operation in order. Combine the three parts in sequence, and using the merged features as the final glass detection result to realize the glass detection and outputting the glass detection result.

Step 6 Verifying the Validity of GDNet

To verify the effectiveness of GDNet, comparing GDNet with the latest methods in other related fields to verify the effectiveness of GDNet. In order to make a fair comparison, the methods in GDNet related fields all use its public codes or settings with original recommended parameters, and they are all trained in the GDD training set and tested on the testing set.

The methods in the related fields include DSS, PiCANet, ICNet, PSPNet, DenseASPP, BiSeNet, PSANet, DANet, CCNet, RAS, R3Net, CPD, PoolNet, BASNet, EGNet, DSC, BDRAR, and MirrorNet.

The beneficial effects of the present invention:

(1) Glasses Detection Results and Efficiency

The present invention solves the severe performance degradation of computer vision system caused by the existence of glass, helps the system distinguish the existence area of the glass and removes the interference of objects behind the glass, and produces accurate glass detection results. The present invention proposes a method for segmenting glasses from RGB images, which relies on LCFI blocks to accurately detect glass.

(2) Larger-Scale Dataset

The present invention realizes the construction of a large-scale dataset, which contains glass and its corresponding segmentation tags, and covers various daily life scenes. In order to solve the problem of glass segmentation, the present invention constructs a large-scale dataset called GDD. The GDD dataset is the first large-scale benchmark for glasses segmentation. To construct the dataset, the present invention uses a camera to capture images and invites professionals to perform image labeling. The present invention has a wide variety of glass types: there are various common glass in the GDD dataset (such as shop windows, glass walls, glass doors, glass guardrails, and glass on windows and cabinets). It also includes other relatively small glass-made objects, such as glass bulb and glass clock. The overall spatial distribution of the glass positions in the present invention tends to be centered because the glasses is usually large and covers the center. In addition, the glass spatial distribution of the training/testing split is consistent with the glass spatial distribution of the entire dataset. Moreover, the glass in the GDD dataset varies greatly in size, and the proportion of the glass area in the image to the image area is mostly in the range of [0.2, 0.8]. More objects/scenes will appear inside the glass, making the GDD dataset more challenging.

DETAILED DESCRIPTION

The specific embodiments of the present invention will be further described below in conjunction with the drawings and technical solutions.

2,827 images were taken from indoor scenes, and 1,089 images were taken from outdoor scenes. All the images were taken in real scenes. For dataset segmentation, 2,980 images are randomly selected for training, and the remaining 936 images are used for testing.

The invention realizes the construction of the glass detection network GDNet on the PyTorch framework. For training, the input image is adjusted to a resolution of 416×416 and augmented by horizontal random flipping. The parameters of the multi-level feature extractor MFE are initialized by the pre-trained ResNeXt101 network, and other parameters are initialized randomly.

Each LCFIM module is composed of 4 LCFI blocks, the kernel sizes of the LCFI blocks are 3, 5, 7, and 9, respectively, and the dilation rates are 1, 2, 3, and 4, respectively. Connecting 4 LCFI blocks to form an LCFIM module, and feeding the feature layer extracted by MFE into the LCFIM module to extract rich context features and perform downsampling. At the same time, adding information flow between two adjacent LCFI blocks for further exploring more contextual features, that is, the output of the current LCFI block is used as the input of the next LCFI block. The selected multi-level feature extractor MFE and LCFIM modules are embedded in the glass detection network GDNet; the glass detection network GDNet includes the multi-level feature extractor MFE, LCFIM module, and subsequent deconvolution operations, and finally the output of the glass detection network GDNet is used as the result of glass detection.

The training process uses a stochastic gradient descent (SGD) equipped with a momentum of 0.9 and a weight decay of $5 \times 10^{-4}$ to optimize the entire network. The learning rate is adjusted through the poly strategy, and the basic learning rate is 0.001. The batch size is set to 6, and the balancing parameters wh, wl, and wf are set to 1 based on experience. It takes about 22 hours for the network to converge on the NVIDIA GTX 1080Ti graphics card. For testing, the image is adjusted to a resolution of 416×416 for network inference. For the final glass detection results, no post-processing procedures such as Conditional Random Field (CRF) are performed.

Figure 1:
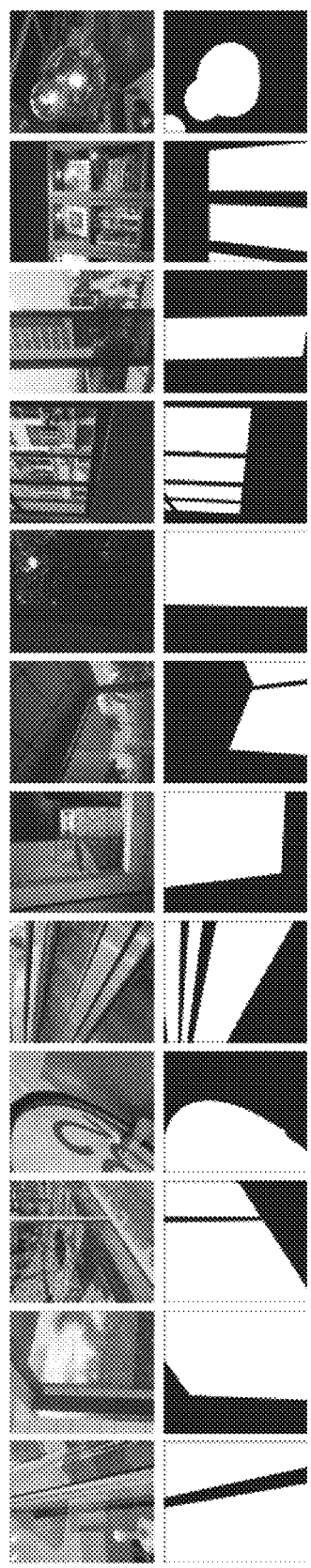
FIG. 1 is a partial picture display of the dataset according to an embodiment of the present invention.

FIG. 1 is a display of part of the images in the glass dataset proposed by the present invention. The GDD dataset is a dataset with about 4,000 images. The GDD dataset includes images of glass in daily life scenes, images of glass with complex object backgrounds, and images of multiple glass, ensuring that the training set and testing set have the same distribution curve, and ensuring the completeness and structural accuracy of the dataset.

Figure 2:
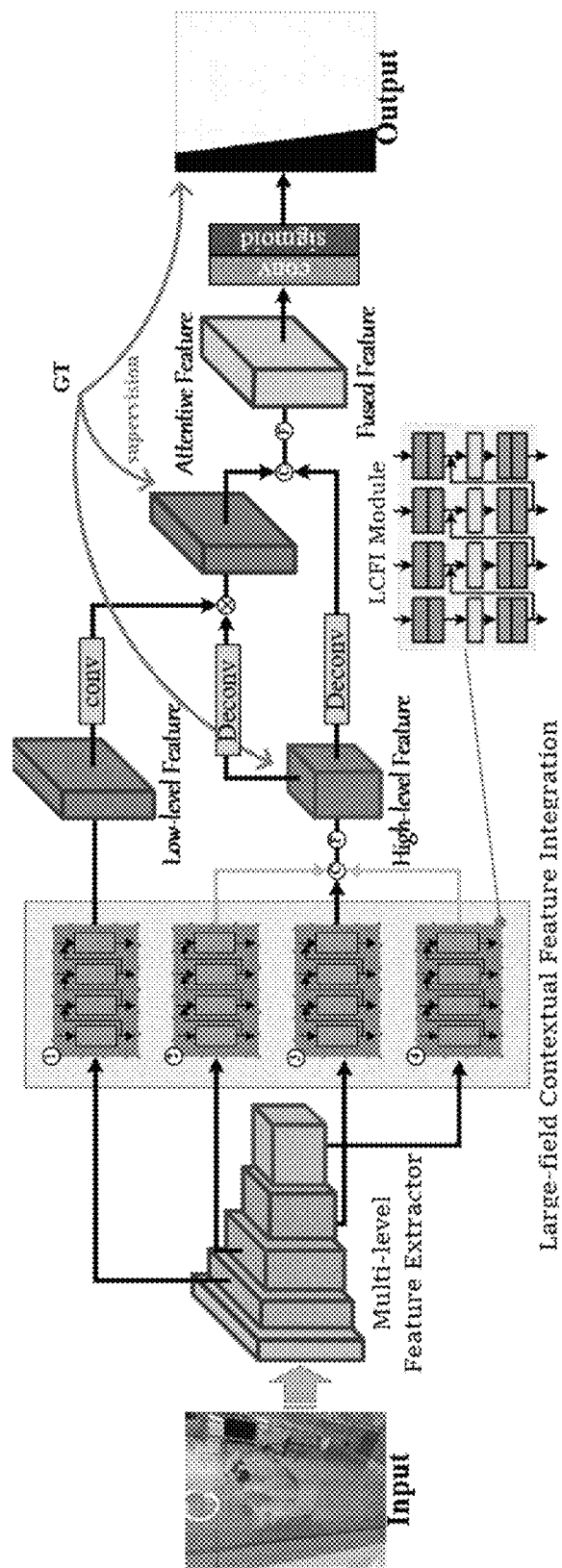
FIG. 2 is the network structure of the GDNet of the present invention.

FIG. 2 is the network structure of GDNet. First, feeding the image into a multi-level feature extractor (MFE) to harvest features of different levels. Then, the four feature layers extracted by MFE are fed into four LCFIM modules to learn a wide range of context features. The outputs of three LCFIM modules are fused together to generate high-level large-scale context features, which will be used to continuously guide the low-level large-scale context features extracted from the first LCFIM module to focus more on place of the glass area. Finally, the high-level large-scale context features and the low-level large-scale context features are fused, and the fused features are used to generate the final glass detection results.

Figure 3:
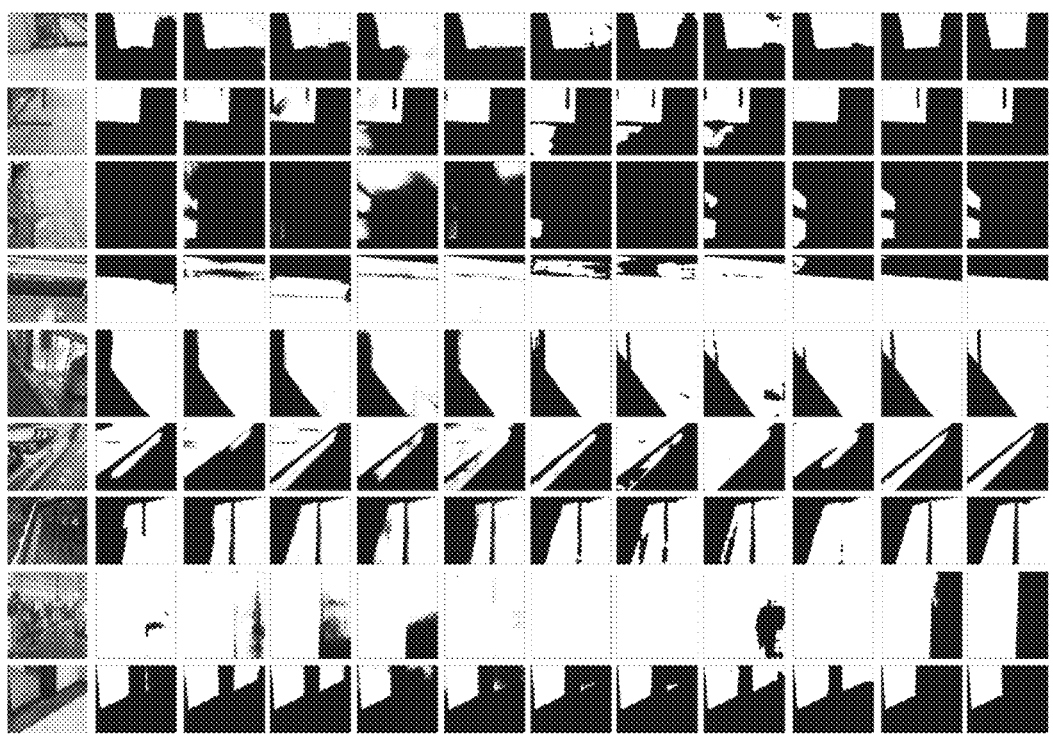
FIG. 3 shows the results of the comparative experiment.

FIG. 3 shows the results of the comparative experiment. The deep network used for semantic/instance segmentation and the public saliency detection code are trained on the GDD dataset. The deep networks include DSS, PiCANet, ICNet, PSPNet, BiSeNet, DANet, CCNet, RAS, R3Net, CPD, PoolNet, BASNet, EGNet, DSC, BDRAR, and MirrorNet. Adjusting the training parameters of these networks during the training process to obtain the best glass detection results. Finally, using the testing set of the GDD dataset to verify and compare the final glass detection results. After experimental comparison, the glass detection network GDNet of the present invention has the best glass detection accuracy rate, which shows that the LCFIM module in GDNet integrates multi-scale context features very well, and verifies the effectiveness of the LCFIM module. And GDNet has god versatility and accuracy. The verification results are shown in the table below.

| Method | IoU↑ | PA↑ | Fβ↑ | MAE↓ | BER↓ |
|---|---|---|---|---|---|
| ICNet | 69.59 | 0.836 | 0.821 | 0.164 | 16.1 |
| PSPNet | 84.06 | 0.916 | 0.906 | 0.084 | 8.79 |
| BiSeNet | 80 | 0.894 | 0.883 | 0.106 | 11.04 |
| PSANet | 83.52 | 0.918 | 0.909 | 0.082 | 9.09 |
| DANet | 84.15 | 0.911 | 0.901 | 0.089 | 8.96 |
| CCNet | 84.29 | 0.915 | 0.904 | 0.085 | 8.63 |
| DSS | 80.24 | 0.898 | 0.89 | 0.123 | 9.73 |
| PiCANet | 83.73 | 0.916 | 0.909 | 0.093 | 8.26 |
| RAS | 80.96 | 0.902 | 0.895 | 0.106 | 9.48 |
| CPD | 82.52 | 0.907 | 0.903 | 0.095 | 8.87 |
| PoolNet | 81.92 | 0.907 | 0.9 | 0.1 | 8.96 |
| BASNet | 82.88 | 0.907 | 0.896 | 0.094 | 8.7 |
| EGNet | 85.04 | 0.92 | 0.916 | 0.083 | 7.43 |
| DSC | 83.56 | 0.914 | 0.911 | 0.09 | 7.97 |
| BDRAR | 80.01 | 0.902 | 0.908 | 0.098 | 9.87 |
| MirrorNet | 85.07 | 0.918 | 0.903 | 0.083 | 7.67 |
| GDNet | 87.63 | 0.939 | 0.937 | 0.063 | 5.62 |

The invention claimed is:

1. A method for glass detection in a real scene, the method comprising:

constructing glass detection dataset (GDD) using cameras and smartphones to capture glass images for constructing the GDD;

the GDD comprising images with different scenes and different sizes of glass scenes; wherein the images are captured in physical scenes;

the captured images are divided into a training set and a testing set;

extracting features using a multi-level feature extractor (MFE), wherein the extracting comprises:

inputting the captured images in the training set into the MFE to extract the features at different levels;

wherein the MFE is implemented by using a feature extraction network;

constructing a large-scale contextual feature integration (LCFI) block using a first cross convolution by extracting a large-scale feature through vertical convolution and horizontal convolution with dilation rate r and kernel size k; and using a parallel cross convolution with reverse order to extract complementary large-scale context features;

combining n LCFI blocks with different sizes to form an LCFI module (LCFI M) to obtain contextual features from different scales, wherein n is an integer;

inputting a feature layer extracted by the MFE into parallel LCFI blocks, and the output of each of the parallel LCFI block is fused through an attention module;

simultaneously, an information flow is added between two adjacent LCFI blocks, wherein the output of a current LCFI block is used as an input for next LCFI block, thereby fusing local features from a previous LCFI block with context features of the current LCFI block, and further processed by the current LCFI block, expanding the different scales;

forming a glass detection network (GDNet) and outputting the detection results by embedding the MFE and the LCFIM into the GDNet to obtain different levels of large-scale context features;

the GDNet includes multi-level feature extraction in sequence as follows: the MFE, the LCFIM and a subsequent deconvolution operation;

combining the MFE, the LCFM, and the subsequent deconvolution operation in sequence, and using the combination as a final glass detection result;

outputting the final glass detection result; and verifying a validity of the GDNet by comparing the GDNet with other methods to verify effectiveness of the GDNet;

the other methods use public codes and default parameters, and the other methods are all trained and tested on the GDD divided into the training set and the testing set.

2. The method for glass detection in the scene according to claim 1, wherein the feature extraction network comprises VGG16 or ResNet50.

3. The method for glass detection in the scene according to claim 1, wherein the other methods include DSS, PiCANet, ICNet, PSPNet, DenseASPP, BiSeNet, PSANet, DANet, CCNet, RAS, R3Net, CPD, PoolNet, BASNet, EGNet, DSC, BDRAR, and MirrorNet.

* * * * *